(12) United States Patent
Van Den Hoek et al.

(10) Patent No.: US 10,313,162 B1
(45) Date of Patent: Jun. 4, 2019

(54) COMMUNICATION DEVICES AND METHODS WITH POWER TRANSFER OVER ISOLATION FOR WAKE-UP

(71) Applicant: NXP B.V., Eindhoven (NL)

(72) Inventors: Stefan Paul Van Den Hoek, Nijmegen (NL); Lucas Pieter Lodewijk Van Dijk, Nijmegen (NL); Cecilius Gerardus Kwakernaat, Nijmegen (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 15/965,532

(22) Filed: Apr. 27, 2018

(51) Int. Cl.
*H04L 25/02* (2006.01)

(52) U.S. Cl.
CPC .................. *H04L 25/0266* (2013.01)

(58) Field of Classification Search
CPC .................................. H04L 25/0266
USPC ........................................ 375/219
See application file for complete search history.

(56) References Cited

U.S. PATENT DOCUMENTS

| | | | | |
|---|---|---|---|---|
| 6,351,530 B1* | 2/2002 | Rahamim | ............. | H04M 11/06 341/143 |
| 8,571,093 B1 | 10/2013 | Van de Beek | | |
| 2017/0324251 A1* | 11/2017 | Hacker | ..................... | H02J 4/00 |

OTHER PUBLICATIONS

Kliger, R., et al., "iCoupler® Isolation in CAN Bus Applications," AN-770 Application Note, 2005 Analog Devices, Inc., pp. 1-8.
Texan Instruments, "ISO Isolated CAN Transceiver," SLLS9 datasheet, Jun. 2009 [Revised Jan. 2015].
NXP Semiconductors, "Galvanically Isolated High-Speed CAN Transceiver," TJF1052i datasheet, May 2016 [Rev 3].

* cited by examiner

*Primary Examiner* — Michael R Neff

(57) ABSTRACT

The embodiments described herein provide communication devices and methods that can facilitate communication between galvanically isolated systems. Specifically, the embodiments facilitate communication to a galvanically isolated system that is shut down without requiring that this shutdown system consume its own power while it is shutdown. To facilitate this, the communication devices and methods provide a wake-up device on the side of the shutdown system and facilitate the transfer of power across the galvanic isolation to the wake-up device when communication to the shutdown system is needed. With the wake-up device powered using power that was transferred across the galvanic isolation, the wake-up device can perform the actions needed to wake up the shutdown system, and can thus facilitate communication between the galvanically isolated systems. Thus, communication between galvanically isolated systems is facilitated without requiring that the shutdown system consume its own power during shutdown periods.

18 Claims, 8 Drawing Sheets

COMMUNICATION DEVICES AND METHODS WITH POWER TRANSFER OVER ISOLATION FOR WAKE-UP

TECHNICAL FIELD

Embodiments described herein relate generally to communication devices and methods, and more particularly, relate to communication over isolation.

BACKGROUND

In many modern electronics applications, it is desirable to provide galvanic isolation between different systems. For example, it can be desirable to provide galvanic isolation between systems that operate at different voltages. However, in many such systems it may also be desirable to provide for communication between the systems while still maintaining galvanic isolation between the systems.

One issue in such systems is providing for communication when one of the systems shutdown. Specifically, some applications may require that a system is shutdown mode maintain the ability to respond to communications from across the galvanic isolation. This has typically required that the system continuously consume power even when shut down or in sleep mode. This power consumption during sleep mode can be particularly problematic in applications that rely upon battery power.

Thus, there remains a continuing need for systems and methods that can facilitate communication over isolation without requiring unwanted power consumption, particularly during shutdown.

DETAILED DESCRIPTION

The embodiments described herein provide communication devices and methods that can facilitate communication between galvanically isolated systems. Specifically, the communication devices and methods facilitate communication to a galvanically isolated system that is shut down without requiring that this shutdown system consume its own power while it is shutdown.

To facilitate this, the communication devices and methods provide a wake-up device on the side of the shutdown system and facilitate the transfer of power across the galvanic isolation to the wake-up device when communication to the shutdown system is needed. With the wake-up device powered using power that was transferred across the galvanic isolation, the wake-up device can perform the actions needed to wake up the shutdown system. This ability to wake up a shutdown system can thus facilitate communication between the galvanically isolated systems. Furthermore, this communication between galvanically isolated systems is facilitated without requiring that the shutdown system consume its own power during shutdown periods.

Figure 1:
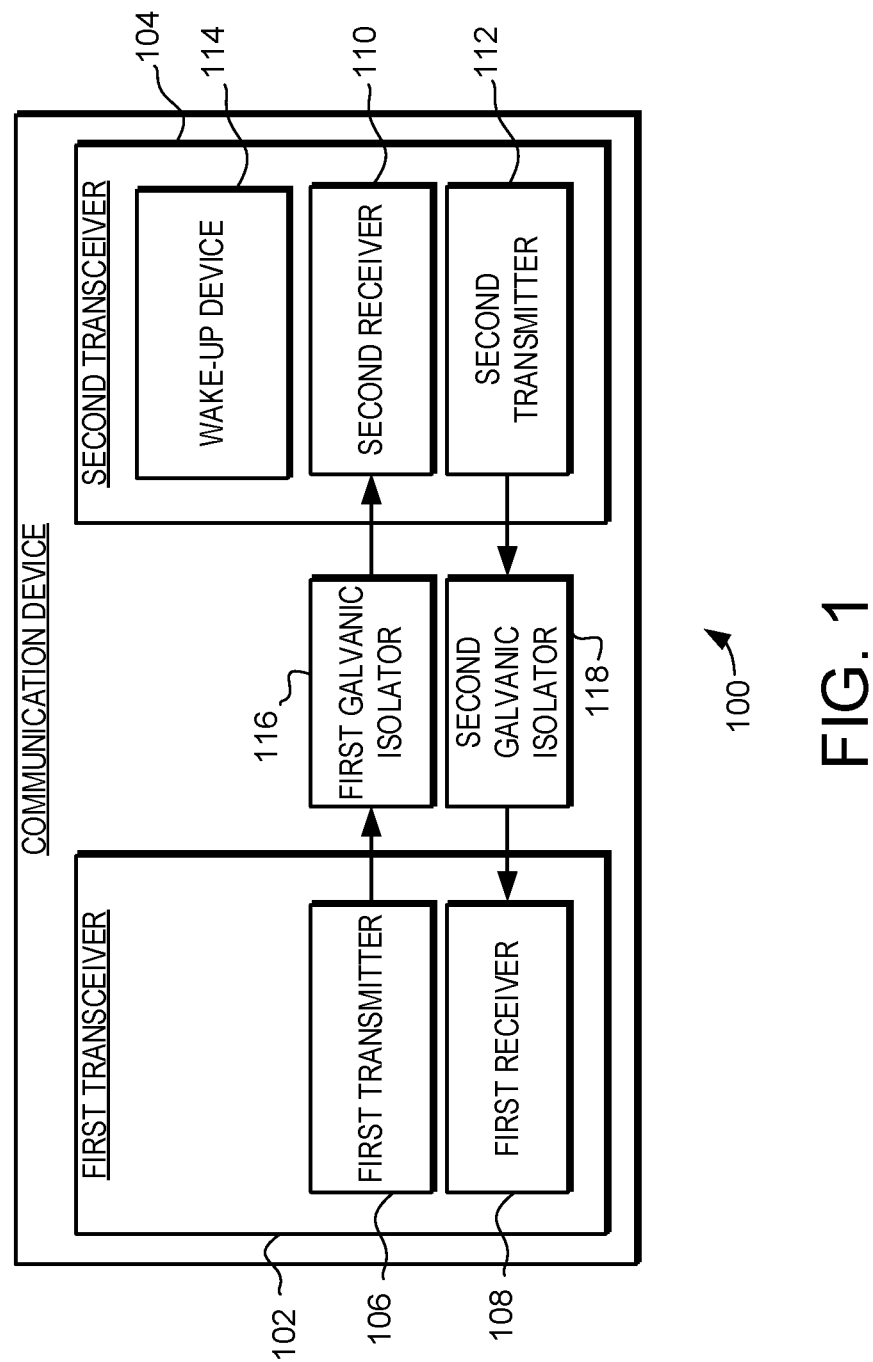
FIG. 1 is a schematic diagram of a communication device in accordance with an exemplary embodiment.

Turning now to FIG. 1, schematic diagram of a communication device 100 in accordance with an exemplary embodiment is illustrated. The communication device 100 includes a first transceiver 102 and a second transceiver 104, where the first transceiver 102 is galvanically isolated from the second transceiver 104. The first transceiver 102 includes a first transmitter 106 and a first receiver 108. The second transceiver 104 includes a second receiver 110, a second transmitter 112 and a wake-up device 114. Communication between the first transceiver 102 and the second transceiver 104 occurs through a first galvanic isolator 116 and a second galvanic isolator 118.

Specifically, the first transmitter 106 is configured to transmit first signals across the first galvanic isolator 116 to the second receiver 110. The second transmitter 112 is likewise configured to transmit the second signals across the second galvanic isolator 118 to the first receiver 108. This configuration allows for communication between galvanically isolated transceivers, and thus the communication device 100 can be used to facilitate communication between systems while maintaining the isolation of those systems.

In accordance with the embodiments described herein, the second transceiver 104 includes a wake-up device 114. In general, the wake-up device 114 is configured to be powered by power transferred from the first transceiver 102 to the second transceiver 104 and is configured to receive a wake-up signal that is transmitted from the first transceiver 102 and across the first galvanic isolator 116. As will be described in greater detail below, this configuration of the communication device 100 facilitates communication to a galvanically isolated system that has been shut down without requiring that the shutdown system consume its own power during shutdown. Specifically, instead of requiring the shutdown system use its own power to monitor for wake-up signals, the wake-up device 114 uses power that is transferred from the first transceiver 102 across galvanic isolation to the second transceiver 104 to the wake-up device 114 when communication to the shutdown system is needed. Furthermore, such power only needs to be transferred when a wake-up of the shutdown system is required, and thus overall power consumption can be reduced.

With the wake-up device 114 powered using power that was transferred across the galvanic isolation, the wake-up device can perform the actions needed to wake up the shutdown system, and can thus facilitate communication between the galvanically isolated systems. For example, the wake-up device 114 can monitor for wake-up signals and can initiate a wake-up when such a signal is received. Thus, communication between galvanically isolated systems is facilitated without requiring that the shutdown system consume its own power during shutdown periods.

For example, in one possible implementation a low voltage system is coupled to the first transceiver 102 and a high voltage system is coupled to the second transceiver 104. In such an implementation it can be critical to keep such high voltage and low voltage systems isolated for each other for a variety of reasons. The communication device 100 when properly configured can facilitate communication between the low voltage system and the high voltage system while maintaining galvanic isolation between the low and high voltage systems.

Furthermore, the wake-up device 114 allows the high voltage system to be shutdown, with no power consumption from the high voltage system being used to monitor for a wake-up signal. This reduces the drain on the high voltage system and can help extend the life span of relatively expensive high voltage batteries and other components.

As stated above, the wake-up device 114 uses power that is transferred from the first transceiver 102 to the second transceiver 104 to the wake-up device 114 when communication to the shutdown system is needed. In one embodiment, this power is transferred over a third galvanic isolator that is distinct from the isolators 116 and 118. Such an embodiment will be discussed in greater detail with reference to FIG. 2. In another embodiment this power is transferred over the first galvanic isolator 116. Such an embodiment will be discussed in greater detail with reference to FIG. 3. In either case this configuration facilitates communication between galvanically isolated systems, and further facilitates the monitoring for wake-up signals without requiring excessive power consumption by any system coupled to the second transceiver 104.

During normal operation the communication device 100 facilitates communication between systems while maintaining galvanic isolation between those systems. To facilitate this communication, the first transceiver 102 and the second transceiver 104 transmits and receives data across the first galvanic isolator 116 and the second galvanic isolator 118. This transmission of data can be done using any suitable transmission techniques and protocols.

Furthermore, the communication device 100 can be configured to communicate with other systems that are coupled to the communication device 10 using any suitable transmission techniques and protocols. As one example, the communication device 100 can be configured to communicate with CAN networks using suitable protocols. As other examples, the communication device 100 can be configured to communicate with Ethernet networks, local interconnect networks, FlexRay networks, with each using any suitable hardware and protocols. In any such implementations the communication device 100 can include the various devices (e.g., hardware circuits and layers) needed to communicate with such systems. Such devices can be formed on the dies with the first transceiver 102 or second transceiver 104, or they can be formed on separate dies. Likewise, such devices can be packaged with the dies having the first transceiver 102 or second transceiver 104, or they can be packaged in separate packages.

In general, the first transmitter 106 and the second transmitter 112 can be implemented with any suitable transmitter circuit or device. For example, such transmitters 102 and 112 can be implemented with suitable modulators and oscillators that are used to encode data. As one specific example, the transmitters 102 and 112 can be implemented to use on/off keying modulation and LC oscillators. Of course, this is just one example and other types of modulators and oscillators can also be used. For example, frequency modulation or phase-shift modulation techniques could be used.

Likewise, the first receiver 108 and the second receiver 110 can be implemented with any suitable receiver devices. For example, such receivers 108 and 110 implemented with suitable demodulators. As one specific example, the receivers 108 and 110 can be implemented to use on/off keying demodulation. Again, this is just one example and other types of demodulators can also be used.

As noted above, the first transceiver 102 is formed to be galvanically isolated from the second transceiver 104. To facilitate this, in one example implementation the first transceiver 102 is on a first die, while the wake-up device 114 is with the second transceiver 104 on a second die. In this case the die would be configured and packaged to be galvanically isolated from the second die. For example, the first die and the second die can be packaged together in a single device package while maintaining galvanic isolation.

Likewise, the first galvanic isolator 116 and the second galvanic isolator 118 can be formed separately on a third die, or can be formed with the first transceiver 102 or the second transceiver 104. Again, in such an implementation the dies would be packaged to maintain galvanic isolation between the first transceiver 102 and the second transceiver 104.

A variety of isolation devices can be used to implement the first galvanic isolator 116 and the second galvanic isolator 118. For example, these isolators can be implemented with capacitive isolators or with transformers.

In one specific embodiment, the wake-up device 114 includes a low-power demodulator configured to demodulate the wake-up signal. In such an embodiment the low-power demodulator can be coupled to a pattern detector configured to detect a pattern in the demodulated wake-up signal. In another specific embodiment, the wake-up device 114 includes a power supply, where the power supply is coupled to the first transceiver 102 and is configured to be powered by the power transferred from the first transceiver 102 to the second transceiver 104. In another specific embodiment, the wake-up device 114 includes a rectifier, where the rectifier is coupled to the first transceiver 102 and is configured to rectify power received from the first transceiver 102. Examples of these embodiments shall be discussed in greater detail with reference to FIGS. 4A and 4B.

In another embodiment, the communication device 100 includes a variable power source formed with the first transceiver 102 and galvanically isolated from the second transceiver 104. In this embodiment the variable power source is configured to selectively provide increased power to the first transmitter 106 to facilitate power transmission across the first galvanic isolator 116 to power the wake-up device. In some embodiments this variable power source can includes a switchable current source, where the switchable current source is configured to selectively provide a relatively high current during wake-up and relatively low current during normal communication. An example of this embodiment shall be discussed in greater detail with reference to FIG. 5.

Figure 2:
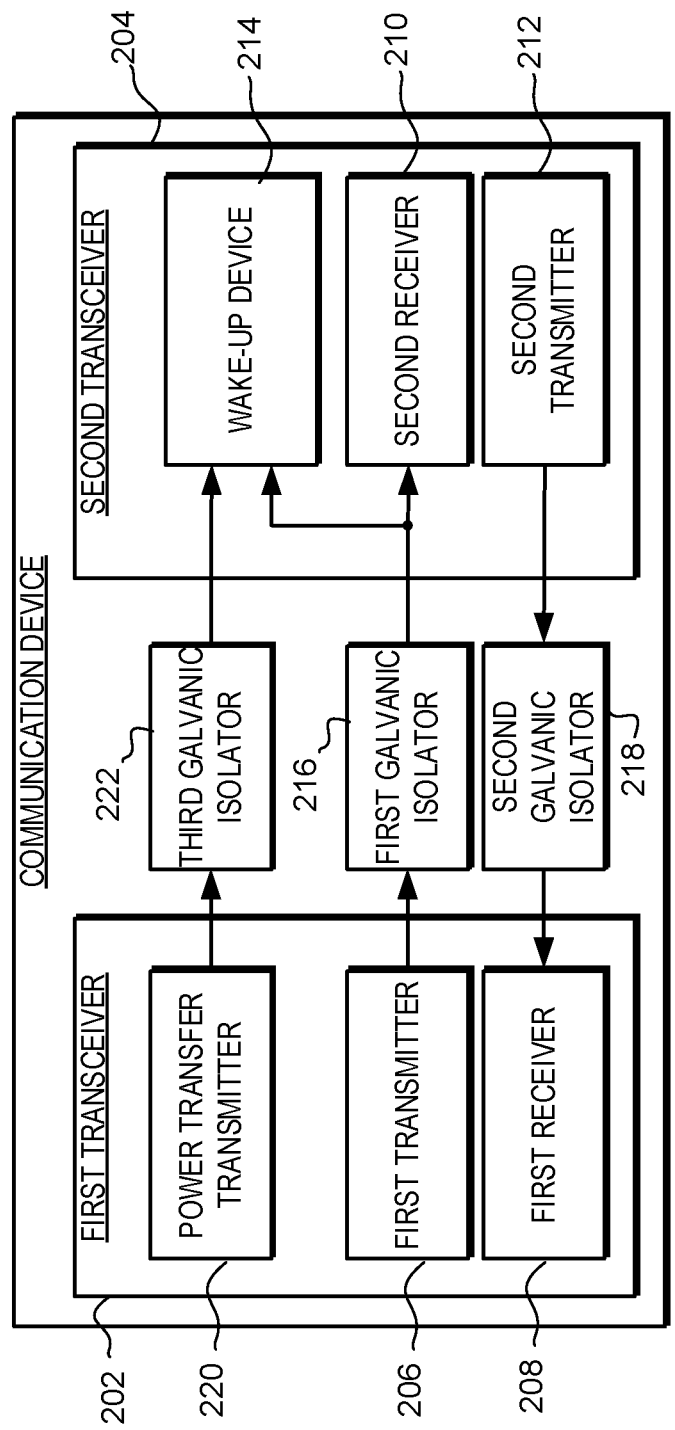
FIG. 2 is a schematic diagram of a communication device in accordance with another exemplary embodiment.

Turning now to FIG. 2, schematic diagram of a communication device 200 in accordance with another exemplary embodiment is illustrated. In general, this communication device 200 is similar to that illustrated in FIG. 1, but also includes a dedicated channel for power transfer.

The communication device 200 includes a first transceiver 202 and a second transceiver 204, where the first transceiver 202 is galvanically isolated from the second transceiver 204. The first transceiver 202 includes a first transmitter 206, a first receiver 208, and a power transfer transmitter 220. The second transceiver 204 includes a second receiver 210, a second transmitter 212 and a wake-up device 214. Communication between the first transceiver 202 and the second transceiver 204 occurs through a first galvanic isolator 216 and a second galvanic isolator 118.

Specifically, the first transmitter 206 is configured to transmit first signals across the first galvanic isolator 216 to the second receiver 210. The second transmitter 212 is likewise configured to transmit the second signals across the second galvanic isolator 218 to the first receiver 208. This configuration allows for communication between galvanically isolated transceivers, and thus the communication device 200 can be used to facilitate communication between systems while maintaining the isolation of those systems.

In accordance with the embodiments described herein, the second transceiver 204 includes a wake-up device 214. In general, the wake-up device 214 is configured to be powered by power transferred from the first transceiver 202 to the second transceiver 204 and is configured to receive a wake-up signal that is transmitted from the first transceiver 202 and across the first galvanic isolator 216. Specifically, the wake-up device 214 uses power that is transferred from the first transceiver 202 to the second transceiver 204 to the wake-up device 214 when communication to the shutdown system is needed.

In this illustrated embodiment, this power is transferred over a third galvanic isolator 222 that is distinct from the isolators 216 and 218. Specifically, this power is transferred from the power transfer transmitter 220 across the third galvanic isolator 222 and to the wake-up device 214, where it is used to power the wake-up device 214. A wake-up signal can then be sent from the first transmitter 206 to the wake-up device 214, and the wake-up device 214 can then initiate a wake-up of the shutdown system.

The use of a dedicated power transfer transmitter 220 and third galvanic isolator 222 can provide several advantages. For example, the use of a dedicated power transfer transmitter 220 and third galvanic isolator 222 can facilitate the continuous transfer of both power and data compared to techniques that use only one isolator and thus must alternate between sending power and second data.

As noted above, the first transceiver 202 is formed to be galvanically isolated from the second transceiver 204. To facilitate this, the third galvanic isolator 222 can be can be formed separately on a separate die, or can be formed with the first transceiver 202 or the second transceiver 204. Again, in such an implementation the dies would be packaged to maintain galvanic isolation between the first transceiver 202 and the second transceiver 204.

Again, the communication device 200 facilitates communication to a galvanically isolated system that has been shut down without requiring that the shutdown system consume its own power during shutdown. Specifically, instead of requiring the shutdown system use its own power to monitor for wake-up signals, the wake-up device 214 uses power that is transferred from the power transfer transmitter 220 across the third galvanic isolator 222 to the wake-up device 214 when communication to the shutdown system is needed.

Figure 3:
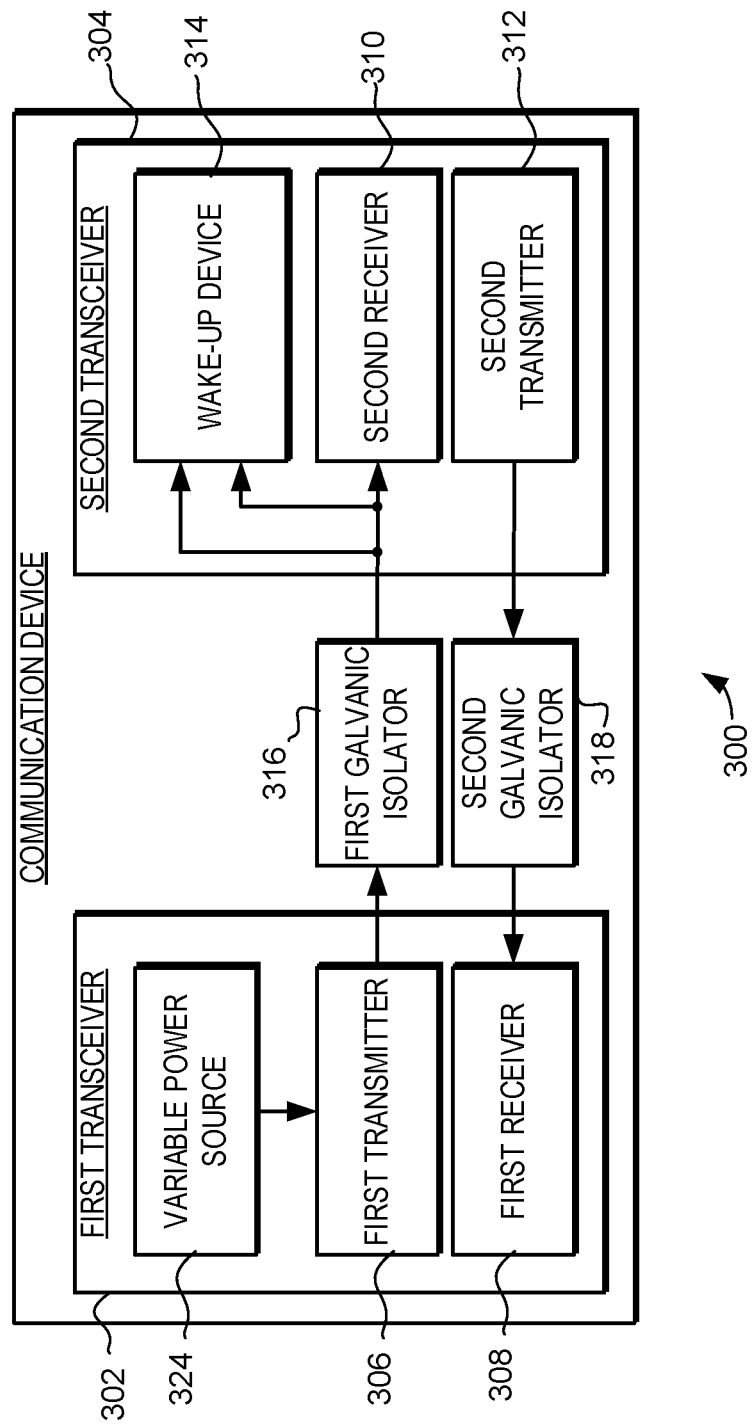
FIG. 3 is a schematic diagram of a communication device in accordance with another exemplary embodiment.

Turning now to FIG. 3, schematic diagram of a communication device 300 in accordance with another exemplary embodiment is illustrated. In general, this communication device 300 is similar to that illustrated in FIG. 1, but also includes a variable power source that is used to provide power for the wake-up device.

The communication device 300 includes a first transceiver 302 and a second transceiver 304, where the first transceiver 302 is galvanically isolated from the second transceiver 304. The first transceiver 302 includes a first transmitter 306, a first receiver 308, and a variable power source 324. The second transceiver 304 includes a second receiver 310, a second transmitter 312, and a wake-up device 314. Communication between the first transceiver 302 and the second transceiver 304 occurs through a first galvanic isolator 316 and a second galvanic isolator 318.

In accordance with the embodiments described herein, the second transceiver 304 includes a wake-up device 314. Again, the wake-up device 314 is configured to be powered by power transferred from the first transceiver 302 to the second transceiver 304 and is configured to receive a wake-up signal that is transmitted from the first transceiver 302 and across the first galvanic isolator 316. Specifically, the wake-up device 314 uses power that is transferred from the first transceiver 302 to the wake-up device 314 when communication to the shutdown system is needed.

In this illustrated embodiment, this power is transferred over the first galvanic isolator 316, the same galvanic isolator that is used for communication from the first transmitter 306 to the second receiver 310. Using the same galvanic isolator to transfer power to the wake-up device 314 can significantly reduce the overall size and cost of the device compared to embodiments that use a separate isolator for power transfer. This is particularly true for implementations that use large capacitive isolators or larger transformers as galvanic isolators.

Again, the communication device 300 facilitates communication to a galvanically isolated system that has been shut down without requiring that the shutdown system consume its own power during shutdown. Specifically, instead of requiring the shutdown system use its own power to monitor for wake-up signals, the wake-up device 314 uses power that is transferred from the first transmitter 306 across the first galvanic isolator 316 to the wake-up device 314 when communication to the shutdown system is needed.

The variable power source 324 is coupled to the first transmitter 306. In this embodiment the variable power source 324 configured to selectively provide increased power to the first transmitter 306 to facilitate power transmission across the first galvanic isolator 316 to power the wake-up device 314.

Specifically, during normal operation the first transmitter 306 can require a relatively low amount of power to operate and provide communication to the second receiver 310. Thus, during normal operation the variable power source 324 can be operated to supply a relatively low amount of power. However, when the connected system is shut down and a wake up needs to be performed the variable power source 324 can then provide an increased amount of power. This increased power facilitates the transfer of power across the first galvanic isolator 316 to the wake-up device 314. There, the transferred power is sufficient to operate the wake-up device 314. A wake-up signal can then be sent from the first transmitter 306 to the wake-up device 314, and the wake-up device 314 can then initiate a wake-up of the shutdown system.

It should be noted that while the variable power source 324 provides an increased amount of power to initiate wake up that this increased power is needed only for a relatively short time. Thus, the overall power consumption of the communication device 300 remains relatively low.

In some embodiments this variable power source 324 can include a switchable current source, where the switchable current source is configured to selectively provide a relatively high current during wake-up and relatively low current during normal communication. An example of this embodiment shall be discussed in greater detail with reference to FIG. 5.

Figure 4A:
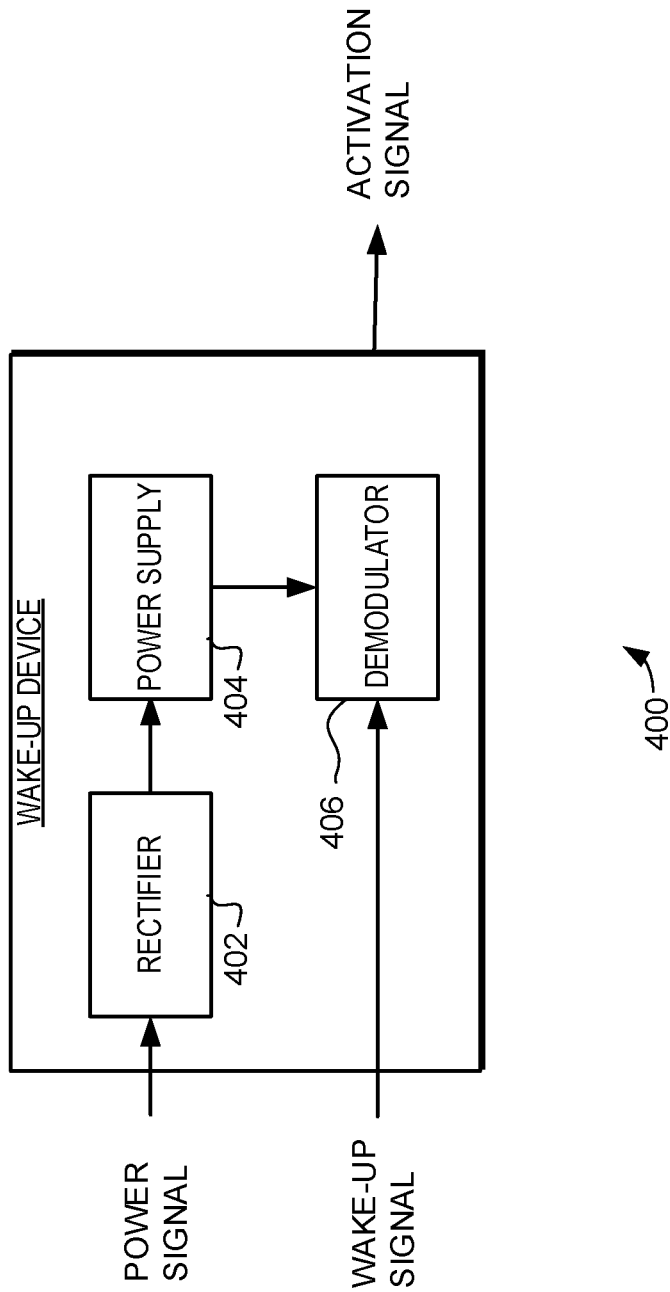
FIGS. 4A and 4B are schematic diagrams of wake-up devices in accordance with exemplary embodiments.

Turning now to FIG. 4A, schematic diagram of an exemplary wake-up device 400 is illustrated. The wake-up device 400 is an example of the type of device that can be used in any of the communication devices 100, 200 and 300 discussed above. In this illustrated embodiment the wake-up device 400 includes a rectifier 402, a power supply 404, and a demodulator 406.

As was described above, the wake-up device 400 is in general configured to be powered by power transferred from a first transceiver and across galvanic isolation. Specifically, instead of requiring a connected system that is shutdown or otherwise in low power mode use its own power to monitor for wake-up signals, the wake-up device 400 uses power that is transferred from the first transceiver across galvanic isolation to the wake-up device 400.

In this illustrated embodiment the wake-up device 400 receives a power signal and a wake-signal. As described above, the power signal can be transferred across a dedicated galvanic isolator (e.g., third galvanic isolator 222 of FIG. 2) or it can be transferred across a galvanic isolator that is also used for data communication (e.g., first galvanic isolator 316 of FIG. 3). In either case, the power signal is transferred across the galvanic isolation and used to power the wake-up device 400.

In the embodiment of FIG. 4A, the power signal received from the galvanic isolation is an AC signal that is applied to the rectifier 402. The rectifier 402 converts the AC power signal to a DC voltage. That DC voltage is then applied to the power supply 404. The power supply 404 converts the received DC voltage into a form that can be used by the other elements of the wake-up device 400. For example, the power supply 404 can filter, stabilize, condition and/or correct the received DC voltage as needed to generate a suitable power supply voltage for the demodulator 406. As such, the power supply 404 can comprise any suitable combination of elements capable of receiving the rectified power signal and generating suitable power supply voltage(s). For example, in some embodiments a relatively large capacitor can be provided as part of the power supply 404 or coupled to the input of the power supply 404. Such a relatively large capacitor can store the transferred power and help maintain the DC voltage that is applied to the input of the power supply 404.

As one specific example, the power supply 404 can comprise a low dropout regulator (LDO) implemented to provide a regulated output voltage very near the received DC voltage. Of course, this is just one example of the type of devices that can be used to generate a suitable power supply voltage for the demodulator 406.

The demodulator 406 is also configured to receive the wake-up signal. As was described above, the wake-up signal is transferred from the first transceiver to the second transceiver over the galvanic isolation. For example, in the embodiment of FIG. 2 the wake-up signal would be transferred from the first transmitter 206 and across the first galvanic isolator 216 and to the wake-up device 214. As another example, in the embodiment of FIG. 3, the wake-up signal can be transferred from the first transmitter 306 and across the first galvanic isolator 316 and to the wake-up device 314.

The demodulator 406 receives the wake-up signal and demodulates the wake-up signal to determine if a wake-up message has been received. To facilitate this, the demodulator 406 can comprise any suitable type of demodulator, including on/off keying demodulators discussed above.

In many typical embodiments it would be desirable to implement the demodulator 406 with a low power device to reduce the amount of power that must be transferred on wake up. Furthermore, such lower power demodulators can be used because of the limited data bandwidths that would typically be required to send a wake-up signal. Examples of low power demodulators that can be used include peak detecting demodulators used for on-off keying. Again, this is just one example and other types of demodulators can also be used.

With the wake-up device 400 powered using power that was transferred across the galvanic isolation, the wake-up device 400 can receive a wake-up signal, demodulate the signal to determine if a valid wake-up message has been received. Then, in response to valid wake-up message the wake-up device 400 can generate an activation signal that will cause the connected system to turn on or otherwise commence operation. Thus, the wake-up device 400 can monitor for wake-up signals and can initiate a wake-up when a valid wake-up message is received.

Figure 4B:
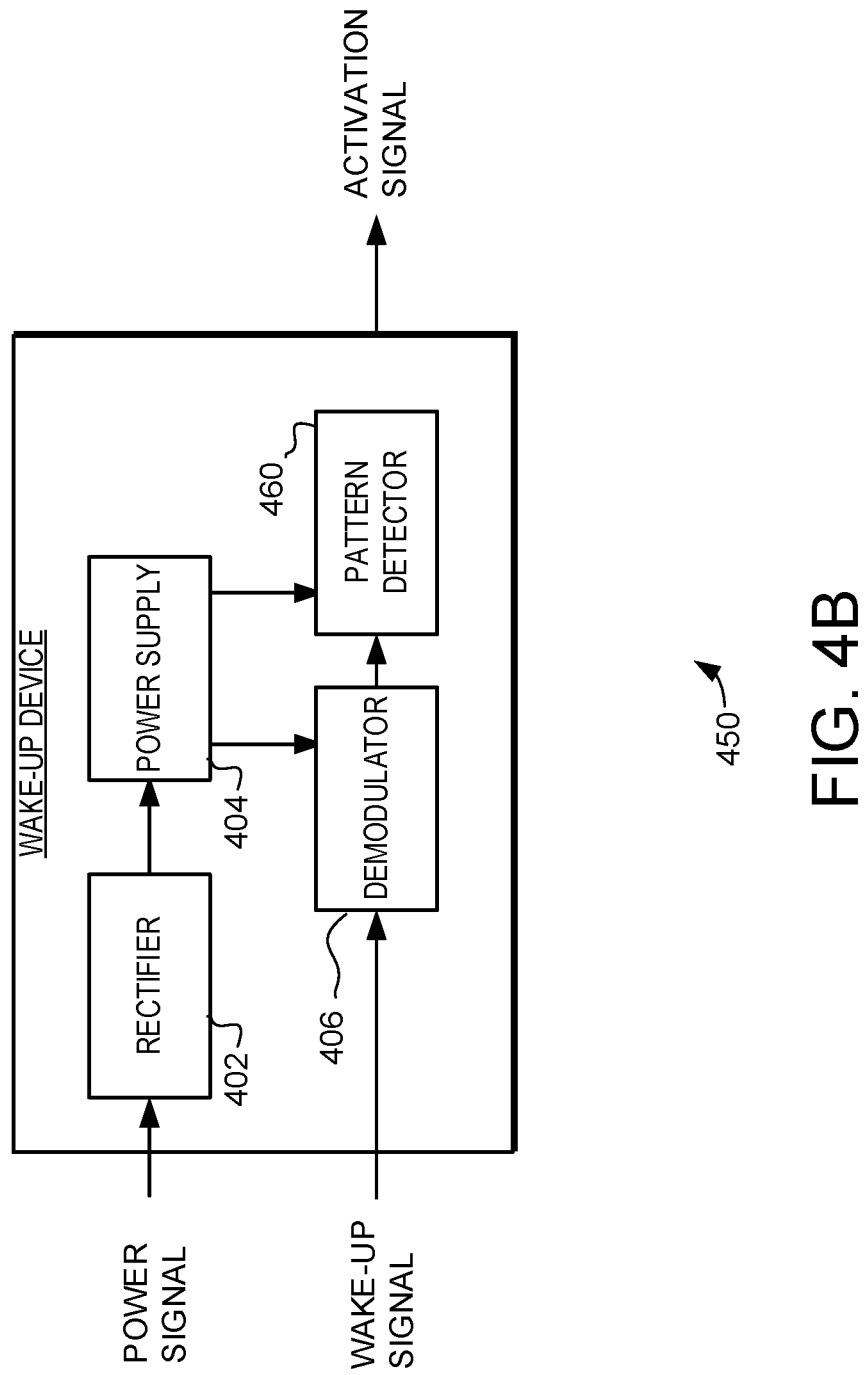

Turning now to FIG. 4B, schematic diagram of another exemplary wake-up device 450 is illustrated. The wake-up device 450 is another example of the type of device that can be used in any of the communication devices 100, 200 and 300 discussed above. In this illustrated embodiment the wake-up device 400 includes a rectifier 402, a power supply 404, a demodulator 406, and a pattern detector 460.

The wake-up device 450 operates in the same general fashion as the wake-up device 400 discussed above, but also includes the pattern detector 460. In this embodiment, the pattern detector 460 can be used to identify valid wake-up messages to ensure that the connected system is only activated in response to a valid request. Specifically, the pattern detector 460 analyses the demodulated wake-up signal to determine if specified pattern indicating a valid wake-up message is present in the wake-up signal. The pattern detector 460 would then be configured to initiate an activation signal only when such a pattern is identified. The use of such a pattern detector 450 can thus ensure that the connected system is only activated in response to a valid wake-up message and is not incorrectly activated in response to noise or other spurious signals that may be transferred to the wake-up detector 450.

The pattern detector 460 can be implemented with any suitable detector and can be implemented to detect any suitable type of pattern. For example, a logic comparison circuit can be implemented to detect specified patterns.

Figure 5:
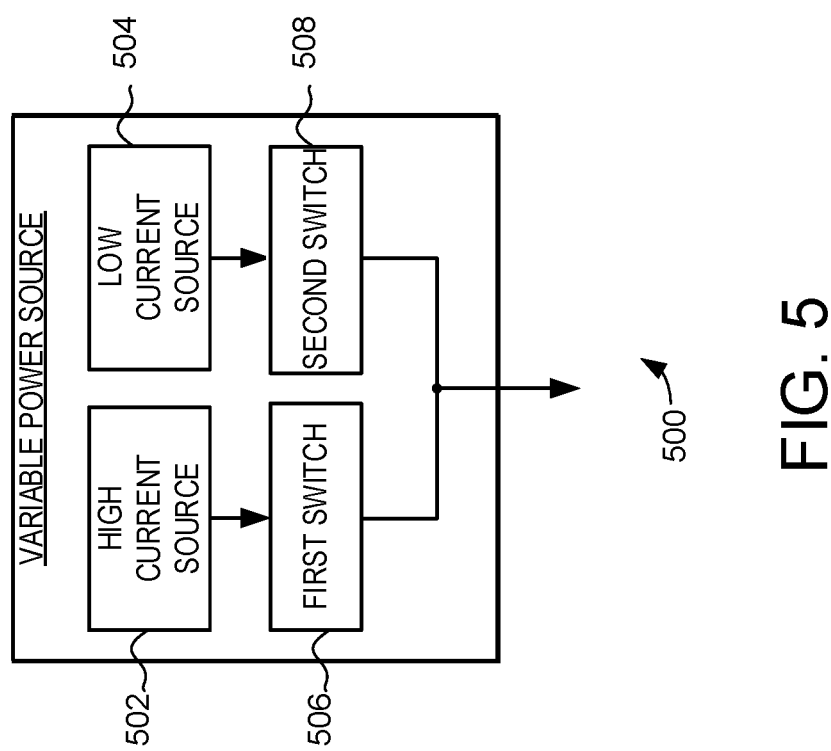
FIG. 5 is a schematic diagram of a variable power supply in accordance with another exemplary embodiment.

Turning now to FIG. 5, schematic diagram of an exemplary variable power source 500 is illustrated. The variable power source 500 is an example of the type of device that can be used in the communication device 300 discussed above. In this illustrated embodiment the variable power source 500 includes a high current source 502, a low current source 504, a first switch 506, and a second switch 508.

In the embodiment of FIG. 5 the variable power source 500 includes a switchable current source. Specifically, the first switch 506 can be used to selectively supply a relatively high current from the high current source 502, while the second switch 508 can be used to selectively supply a relatively low current from the low current source 504. Thus, by selectively controlling the first switch 506 and the second switch 508 the variable current source 500 can provide a relatively high current during wake-up and relatively low current during normal communication.

Specifically, during normal operation the variable power source 500 can be operated to supply a relatively low amount of power to the transmitter to facilitate routine data communication in the communication device. However, when the connected system is shut down and a wake up needs to be performed the variable power source 500 can be switched to provide an increased amount of power. This increased power provides sufficient power across the galvanic isolation to power the wake-up device. It should be noted that while the variable power source 500 provides an increased amount of power to initiate s wake up that this increased power is needed only for a relatively short time periods. Thus, the overall power consumption of the communication device remains relatively low.

Figure 6B:
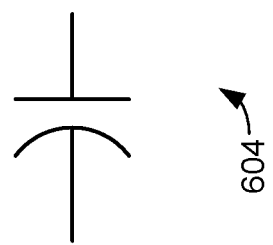
FIGS. 6A and 6B are schematic diagrams of galvanic isolators in accordance with exemplary embodiments.
Figure 6A:
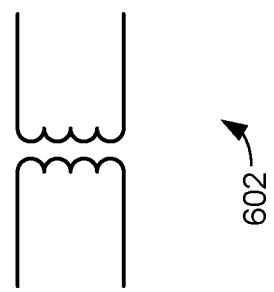

As was described above, a variety of isolation devices can be used to implement the various galvanic isolators used to provide isolation in the communication devices. Turning to FIGS. 6A and 6B, two exemplary galvanic isolators are illustrated. Specifically, FIG. 6A illustrates an exemplary transformer based isolation 602. Likewise, FIG. 6B illustrates an exemplary capacitive based isolation 604.

In general, the transformer based isolation 602 can be implemented with any suitable transformer structure, including discrete and integrated transformers. For example, the transformer based isolation 602 can be implemented with an integrated coreless coupled inductor pair. Alternatively, the transformer based isolation 602 can be implemented with a pair of discrete transformers.

Likewise, the capacitive based isolation 605 can be implemented with any suitable capacitive structure, including integrated passive capacitors and discrete capacitors. As one specific example, the capacitive based isolation 605 can be implemented with coupled field plates that are separated with a suitable dielectric.

Figure 7:
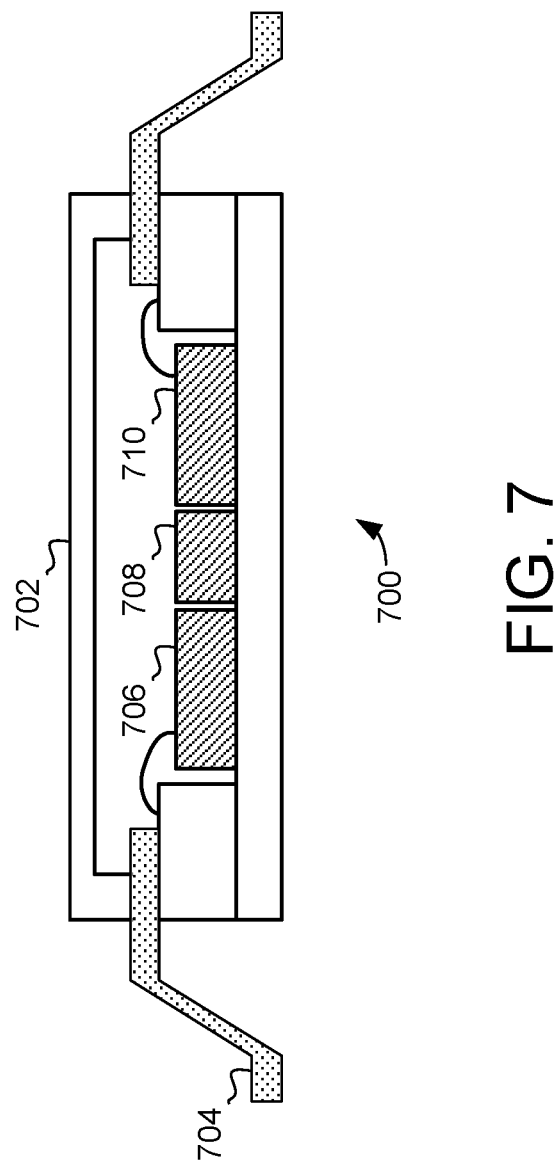
FIG. 7 is a cross sectional side view of packaged communication device in accordance with exemplary embodiments.

Turning now to FIG. 7, a cross sectional view of an exemplary packaged communication device 700 is illustrated. The packaged communication device 700 includes a package 702, terminations 704 and integrated circuit (IC) dies 706, 708, and 710.

In general, the package 702 serves to contain the IC dies and associated elements and provides the terminations (e.g., leads) that are used to connect the elements inside the package to external systems outside the package 702. As such, the package 702 can be any suitable type of semiconductor package, such as an air cavity package or over molded package. As one example, the package 702 can be a surface mount package that utilizes an array of surface mount leads as terminations.

The IC dies 706, 708 and 710 include the various integrated devices that implement the communication device 700 and can include any suitable type of integrated circuits. In one embodiment the IC die 706 would include the integrated circuits that form the first transceiver, the IC die 708 would include the galvanic isolators, and the IC die 710 would include the integrated circuits that form the second transceiver with the wake-up device. In this case, the dies would be configured and packaged such that the IC die 706 is galvanically isolated from the IC die 710.

So implemented the embodiments described herein provide communication devices and methods that can facilitate communication between galvanically isolated systems. Specifically, the embodiments provide a wake-up device on the side of the shutdown system and facilitate the transfer of power across the galvanic isolation to the wake-up device when communication to the shutdown system is needed. With the wake-up device powered using power that was transferred across the galvanic isolation, the wake-up device can perform the actions needed to wake up the shutdown system, and can thus facilitate communication between the galvanically isolated systems.

In a first embodiment, a communication device is provided, the communication device comprising: a first transceiver, the first transceiver including a first transmitter and a first receiver, the first transmitter configured to transmit first signals across a first galvanic isolator, the first receiver configured to receive second signals transmitted across a second galvanic isolator; a second transceiver galvanically isolated from the first transceiver, the second transceiver including a second transmitter and a second receiver, the second transmitter configured to transmit the second signals across the second galvanic isolator, and the second receiver configured to receive the first signals transmitted across the first galvanic isolator; and a wake-up device, the wake up device configured to be powered by power transferred from the first transceiver to the second transceiver, the wake-up device including a wake-up receiver coupled to the first galvanic isolator and configured to receive a wake-up signal across the first galvanic isolator.

In another embodiment, a communication device is provided, the communication device comprising: a first transceiver, the first transceiver including a first transmitter, a first receiver, and a power transfer transmitter, the first transmitter configured to transmit first signals across a first galvanic isolator, the first receiver configured to receive second signals transmitted across a second galvanic isolator, the power transfer transmitter configured to transmit power signals across a third galvanic isolator; a second transceiver galvanically isolated from the first transceiver, the second transceiver including a second transmitter and a second receiver, the second transmitter configured to transmit the second signals across the second galvanic isolator, and the second receiver configured to receive the first signals transmitted across the first galvanic isolator; and wherein the second transceiver further includes a wake-up device, the wake-up device including a power supply, the power supply coupled to the third galvanic isolator and configured to be powered by the power signals transferred across the third galvanic isolator, the wake-up device including a wake-up receiver powered by the power supply and coupled to the first galvanic isolator and configured to receive a wake-up signal across the first galvanic isolator.

In another embodiment, a communication device is provided, the communication device comprising: a first transceiver, the first transceiver including a first transmitter and a first receiver, the first transmitter configured to transmit first signals across a first galvanic isolator, the first receiver configured to receive second signals transmitted across a second galvanic isolator; a second transceiver, the second transceiver galvanically isolated from the first transceiver, the second transceiver including a second transmitter and a second receiver, the second transmitter configured to transmit the second signals across the second galvanic isolator, and the second receiver configured to receive the first signals transmitted across the first galvanic isolator; wherein the first transceiver further includes a variable power source, the variable power source configured to selectively provide power to the first transmitter to transmit power signals across the first galvanic isolator; and wherein the second transceiver further includes a wake-up device, the wake-up device configured to be powered by the power signals transferred across the third galvanic isolator, the wake-up device including a wake-up receiver coupled to the first galvanic isolator and configured to receive a wake-up signal across the first galvanic isolator.

In another embodiment, a method of providing communication is provided, the method comprising: transmitting a power signal from a first transceiver to a second transceiver across galvanic isolation, the first transceiver including a first transmitter and a first receiver, the second transceiver including a second transmitter, a second receiver and a wake-up device, and wherein the first transceiver is galvanically isolated from the second transceiver; powering the wake-up device with power derived from the power signal; transmitting a wake-up signal from the first transceiver to the wake-up device across a first galvanic isolator; and activating a system coupled to the second transceiver in response to the wake-up signal being received by the wake-up device.

For the sake of brevity, conventional techniques related to signal processing, sampling, analog-to-digital conversion, digital-to-analog conversion, analog circuit design, differential circuit design, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. It should be understood that circuitry described herein may be implemented either in silicon or another semiconductor material or alternatively by software code representation thereof.

As used herein, a "node" means any internal or external reference point, connection point, junction, signal line, conductive element, or the like, at which a given signal, logic level, voltage, data pattern, current, or quantity is present. Furthermore, two or more nodes may be realized by one physical element (and two or more signals can be multiplexed, modulated, or otherwise distinguished even though received or output at a common mode). The foregoing description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Unless expressly stated otherwise, "coupled" means that one element is directly or indirectly joined to (or directly or indirectly communicates with) another element, and not necessarily mechanically. Thus, although the schematics shown in the figures depict exemplary arrangements of elements, additional intervening elements, devices, features, or components may be present in an embodiment of the depicted subject matter. In addition, certain terminology may also be used in the foregoing description for the purpose of reference only, and thus are not intended to be limiting.

The terms "first," "second," "third," "fourth" and the like in the description and the claims are used for distinguishing between elements and not necessarily for describing a particular structural, sequential or chronological order. It is to be understood that the terms so used are interchangeable under appropriate circumstances. Furthermore, the terms "comprise," "include," "have" and any variations thereof, are intended to cover non-exclusive inclusions, such that a circuit, process, method, article, or apparatus that comprises a list of elements is not necessarily limited to those elements, but may include other elements not expressly listed or inherent to such circuit, process, method, article, or apparatus.

The foregoing description of specific embodiments reveals the general nature of the inventive subject matter sufficiently that others can, by applying current knowledge, readily modify and/or adapt it for various applications without departing from the general concept. Therefore, such adaptations and modifications are within the meaning and range of equivalents of the disclosed embodiments. The inventive subject matter embraces all such alternatives, modifications, equivalents, and variations as fall within the spirit and broad scope of the appended claims.

What is claimed is:

1. A communication device, comprising:
 a first transceiver, the first transceiver including a first transmitter and a first receiver, the first transmitter configured to transmit first signals across a first galvanic isolator, the first receiver configured to receive second signals transmitted across a second galvanic isolator;
 a second transceiver galvanically isolated from the first transceiver, the second transceiver including a second transmitter and a second receiver, the second transmitter configured to transmit the second signals across the second galvanic isolator, and the second receiver configured to receive the first signals transmitted across the first galvanic isolator; and
 a wake-up device, the wake-up device configured to be powered by power transferred from the first transceiver to the second transceiver, the wake-up device including a wake-up receiver coupled to the first galvanic isolator and configured to receive a wake-up signal across the first galvanic isolator, wherein the wake-up device is configured to be powered by the power transferred from the first transceiver to the second transceiver over the first galvanic isolator.

2. The communication device of claim 1, wherein the first transceiver further includes a power transfer transmitter, the power transfer transmitter configured to transmit power signals across a third galvanic isolator to the wake-up device to power the wake-up device.

3. The communication device of claim 1, wherein the wake-up device includes a low-power demodulator configured to demodulate the wake-up signal.

4. The communication device of claim 3, wherein the wake-up device includes a pattern detector configured to detect a pattern in the demodulated wake-up signal.

5. The communication device of claim 1, wherein the wake-up device includes a power supply, the power supply configured to be powered by the power transferred from the first transceiver to the second transceiver.

6. The communication device of claim 1, wherein the wake-up device includes a rectifier, the rectifier configured to rectify power received from the first transceiver.

7. The communication device of claim 1, further comprising a variable power source, the variable power source formed with the first transceiver and galvanically isolated from the second receiver, and wherein the variable power source is configured to selectively provide increased power to the first transmitter to facilitate power transmission across the first galvanic isolator to power the wake-up device.

8. The communication device of claim 7, wherein the variable power source includes a switchable current source, the switchable current source configured to selectively provide a relatively high current during wake-up and relatively low current during normal communication.

9. The communication device of claim 1, wherein the first transceiver is on a first die, wherein the wake-up device is with the second transceiver on a second die, and wherein the first die is galvanically isolated from the second die are, and wherein the first die and the second die are packaged together in a single device package.

10. The communication device of claim 1, wherein the first galvanic isolator comprises a first capacitive isolator and wherein the second galvanic isolator comprises a second capacitive isolator.

11. The communication device of claim 1, wherein the first galvanic isolator comprises a first transformer and wherein the second galvanic isolator comprises a second transformer.

12. A communication device, the communication device comprising:
 a first transceiver, the first transceiver including a first transmitter and a first receiver, the first transmitter configured to transmit first signals across a first galvanic isolator, the first receiver configured to receive second signals transmitted across a second galvanic isolator;

a second transceiver, the second transceiver galvanically isolated from the first transceiver, the second transceiver including a second transmitter and a second receiver, the second transmitter configured to transmit the second signals across the second galvanic isolator, and the second receiver configured to receive the first signals transmitted across the first galvanic isolator;

wherein the first transceiver further includes a variable power source, the variable power source configured to selectively provide power to the first transmitter to transmit power signals across the first galvanic isolator; and wherein the second transceiver further includes a wake-up device, the wake-up device configured to be powered by the power signals transferred across the third galvanic isolator, the wake-up device including a wake-up receiver coupled to the first galvanic isolator and configured to receive a wake-up signal across the first galvanic isolator.

13. The communication device of claim 12, wherein the first transceiver is formed on a first semiconductor die, the second transceiver is formed on a second semiconductor die separate from the first semiconductor die, and wherein the first semiconductor die and the second semiconductor die are encased together in a semiconductor device package.

14. A method of providing communication, the method comprising:

transmitting a power signal from a first transceiver to a second transceiver across galvanic isolation, the first transceiver including a first transmitter and a first receiver, the second transceiver including a second transmitter, a second receiver and a wake-up device, and wherein the first transceiver is galvanically isolated from the second transceiver;

powering the wake-up device with power derived from the power signal;

transmitting a wake-up signal from the first transceiver to the wake-up device across a first galvanic isolator; and activating a system coupled to the second transceiver in response to the wake-up signal being received by the wake-up device, wherein the step of activating the system coupled to the second transceiver comprises demodulating the wake-up signal and detecting a pattern in the demodulated wake-up signal.

15. The method of claim 14, wherein the step of transmitting the power signal from the first transceiver to the second transceiver across galvanic isolation comprises transmitting the power signal across a separate galvanic isolator.

16. The method of claim 14, wherein the step of transmitting the power signal from the first transceiver to the second transceiver across galvanic isolation comprises transmitting the power signal across the first galvanic isolator.

17. The method of claim 14 further comprising rectifying the power signal to generate a power supply voltage for the wake-up device.

18. The method of claim 14 further comprising selectively provide increased power to the first transmitter to facilitate power transmission across the first galvanic isolator to power the wake-up device.

* * * * *